United States Patent [19]

Chen

[11] Patent Number: 5,462,662
[45] Date of Patent: Oct. 31, 1995

[54] OIL FILTER STRUCTURE

[76] Inventor: Chin-Chuan Chen, No. 46-1, Sec. 5, Nang King E. Rd., Taipei City, Taiwan

[21] Appl. No.: 304,125

[22] Filed: Sep. 12, 1994

[51] Int. Cl.$^6$ .................................................. B01D 35/06
[52] U.S. Cl. .................................... 210/223; 210/440
[58] Field of Search ................................. 210/223, 315, 210/316, 440, 295

[56] References Cited

U.S. PATENT DOCUMENTS 5,228,990  7/1993  Chiang ................................. 210/223

Primary Examiner—Matthew O. Savage
Attorney, Agent, or Firm—Ezra Sutton

[57] ABSTRACT

An oil filter includes a magnetic filtering device disposed inside the canister of the filter. The magnetic filtering device includes a pair of oppositely arranged particle collection members each having a recess in contact engagement with each other so as to define a ring space to secure therein a ring magnet. Each of the particle collection members has a plurality of particle collection slots formed thereon and located in close proximity of the magnetic poles of the ring magnet. A top member is mounted to the upper one of the particle collection members to define an upper oil path and a base member is mounted to the lower one of the particle collection members to support the magnet in position and define a lower oil path for conduction of the oil through the particle collection slots of the upper and lower particle collection members to have ferrous metal particle carried by the oil attracted and collected within the particle collection slots of the upper and lower particle collection members.

20 Claims, 7 Drawing Sheets

OIL FILTER STRUCTURE

FIELD OF THE INVENTION

The present invention relates generally to an oil filter for use with an automobile engine and in particular to an oil filter using magnet to remove ferrous metal particles carried by the oil flow.

BACKGROUND OF THE INVENTION

Oil has been a must for lubrication and cooling of an internal combustion engine. The quality of the oil plays an important roll for the service-life and the operation of the engine. Besides the quality of the oil, particles, especially metallic ferrous particle (basically ferrous metal particles), which are generated during the operation of the engine are also a factor that affects the service life of the engine. These metal particles are destructive to the engine, for they circulate with the oil to the moving parts of the engine and cause wearing and abrasion on the moving parts which in turn generate more ferrous metal particles. To overcome such a problem, an oil filter is devised to filter and clean the oil. The oil filter has been well known and being improved for may years. In general, an oil filter comprises a canister housing inside which filtering means, such as filtering paper or other porous material which allows the oil to flow through but stops the ferrous metal particles and thus cleans the oil. An example is disclosed in Taiwan patent publication No. 170,160.

Oil filters of this structure have been a standard for many years. However, due to the requirement of the minimum flow rate of the oil for lubrication and cooling of the engine, this oil filter structure is incapable to filter out minute particles, for it must have large enough openings to establish the required oil flow rate.

To overcome such a problem, magnet means has been disposed inside the oil filter to attract and thus remove the minute ferrous metal particles out of the oil flow. Some examples of the magnetic oil filters are demonstrated in U.S. Pat. Nos. 4,450,075, 4,613,435, 4,826,592, 4,851,116, 5,078,871 and 5,228,990 and Taiwan patent publication Nos. 165,334, 181,638 (which is corresponding to U.S. Pat. No. 5,228,990) and 195,840. All these patents comprise magnet means in different forms disposed inside the oil filter canister for removing ferrous metal particle out of oil flow within the canister.

Although the conventional magnetic oil filters mentioned above do work well in removing minute metal particles from the oil flow, they have at least one major problem, namely, these oil filters comprise no metal particle collection means to allow the particles to be collected and securely held. Without the particle collection means, the ferrous metal particles that are attracted by the magnet means will gather around the magnet means and held thereon only by the magnetic force. The gathering of the metal particles may form a blockage to the oil flow.

Furthermore, since the metal particles are only held by the magnetic force and since the magnetic force to some extent may be overcome by the vibration and shake of the engine or the automobile on which the engine is mounted during their operations, the ferrous metal particles that are attracted around the magnet means may re-enter the oil flow. This reduces the effectiveness of the conventional magnetic oil filters.

An even more serious problem caused by the metal particles that are shaken to release from the magnet means and re-enter the oilflow is that these particles may be magnetized to some degree by the magnet means during their contact engagement with the magnet means and thus in their re-circulation within the engine, they may attract each other and form a large particle which causes a more serious damage to the engine if allowed to circulate with the oil flow.

Moreover, in some of the conventional magnetic oil filters, such as U.S. Pat. No. 5,228,990, the magnet means is fixed inside the canister by means of adhesive. Due to the high temperature condition during the normal operation of the engine, the oil flow that is thus maintained in a substantial high temperature deteriorates the adhesive and thus may cause failure of the adhesive. The failure of the adhesive results in un-securing the magnet means and thus damaging the oil filter. In certain conditions, the un-secured magnet means may also block the oil outlet and this causes an even more dangerous problem to the operation of the engine.

In some other magnetic oil filters, the magnetic means and the related parts are held inside the filter canister by means of frictional force provided by elastic deformation of the parts. However, due to the fact that to avoid unnecessary magnetization of the parts, some of the parts are made of aluminum which, as is generally well known, is less flexible and thus may not be able to provide desired elastic deformation for the provision of frictional force to hold the parts in position. As a result, the vibration and shake of the engine and/or the automobile may cause the magnet means and the related parts to disengage and thus damage the function of the oil filter.

SUMMARY OF THE INVENTION

It is therefore a primary object of the present invention to provide an improvement of the magnetic oil filter which substantially overcomes the above-mentioned problems and drawbacks of the conventional magnetic oil filters.

In accordance with a first aspect of the present invention, particle collection means is provided inside the filter canister to collect and hold the ferrous metal particles therein so as to prevent the ferrous metal particles from disengaging from the magnet means and re-entering the oil flow and also prevent these particles from piling up to form a blockage to the oil flow.

In accordance with a second aspect of the present invention, oil flow paths are provided inside the filter canister in such a way as to conduct the oil to flow around the locations where the magnetic force provided by the magnet means is strongest, such as the locations that are in proximity of the magnetic poles of the magnet means.

In accordance with a third aspect of the present invention, securing means rather than adhesive is provided to securely fix the magnet means, together with its support member, inside the filter canister.

In accordance with a fourth aspect of the present invention, the magnet means is secured on its support by means of fastener, such as rivet, rather than by means of frictional force induced by elastic deformation.

In accordance with a fifth aspect of the present invention, the support of the magnet means comprises a non-magnetizable material so as to allow the magnetic flux emitting from the magnet means to be concentrated at desired orientation and location to enhance the attraction of the ferrous metal particles carried by the oil flow.

In accordance with a sixth aspect of the present invention, the support of the magnet comprises such a structure and is so fixed inside the filter canister that the oil flow is completely conducted through the magnet means to have the ferrous metal particle carried thereby substantially removed out of the oil flow.

Further aspects of the present invention are to provide a magnet means to be used inside an oil filter which is simple in structure and thus inexpensive in cost, the magnet means being able to disposed inside the filter canister without any modification and change to the original structural design and the original requirement of the oil flow rate.

BRIEF DESCRIPTION OF THE DRAWINGS

The present invention will be better understood from the following description of a preferred embodiment of the present invention, with reference to the attached drawings, wherein.

DETAILED DESCRIPTION OF THE PREFERRED EMBODIMENT

Figure 1:
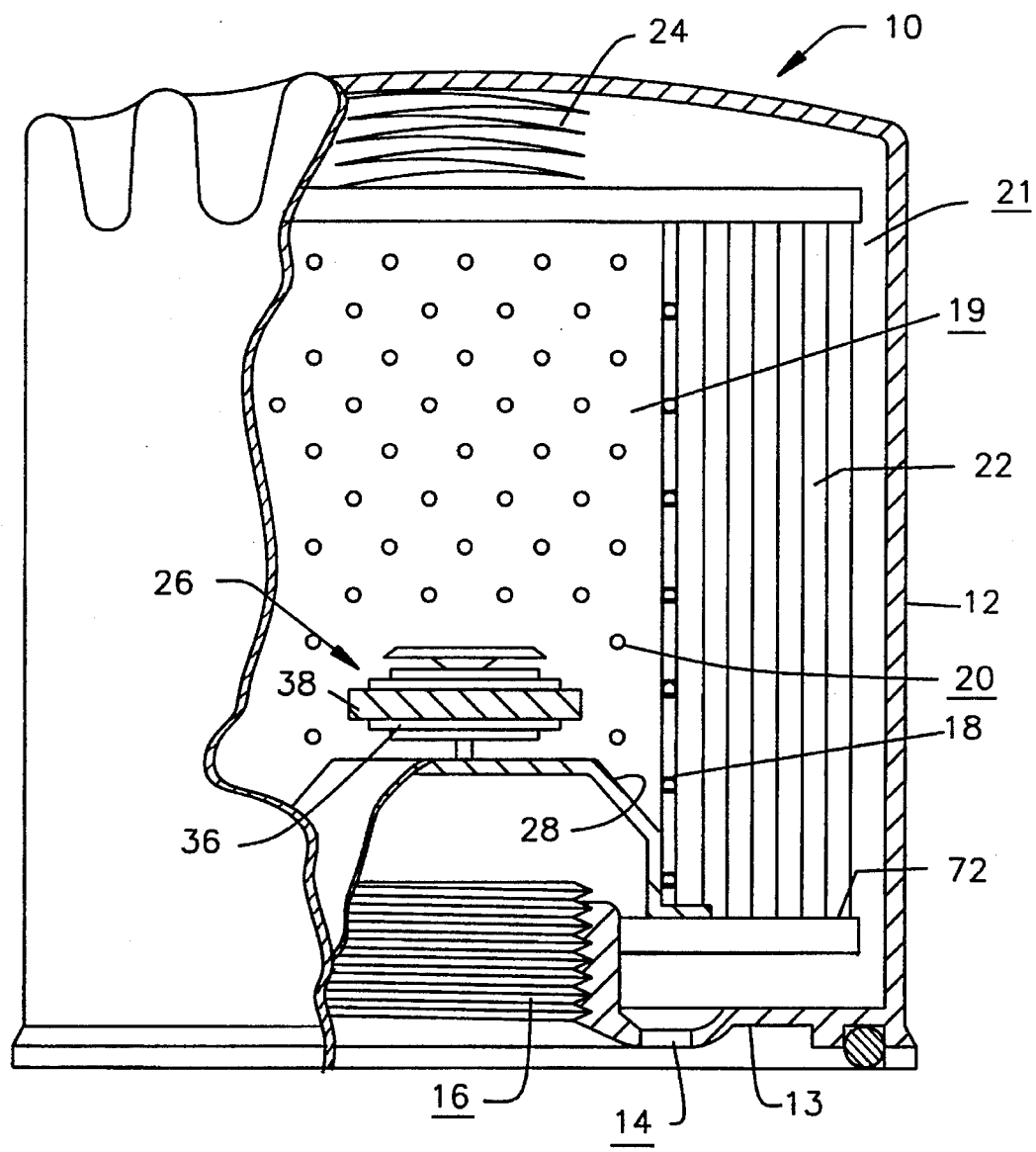
FIG. 1 is a perspective view of an oil filter constructed in accordance with a preferred embodiment of the present invention, which is partially broken to show the inside structure thereof.

With reference to the drawings and in particular to FIG. 1, wherein an oil filter constructed in accordance with the present invention, generally designated with the reference numeral 10, is shown, the oil filter 10 comprises a housing 12 having a bottom 13 on which an oil outlet 16, preferably centrally located, is formed with a plurality of oil inlets 14 among which only one is shown in the drawings, formed around the central outlet 16. In general, the outlet 16 is inner-threaded to be engageable to an engine (not shown). The oil flows into the oil filter 10 via the inlets 14, circulates through the oil filter 10 and then exits the oil filter 10 via the outlet 16 to return back to the engine.

The oil filter 10 comprises a foraminated sleeve 18, having formed thereon a plurality of apertures 20, preferably in a uniformly distributed manner, disposed inside the housing 12 to define a first space 19 of a first diameter encircled by the foraminated sleeve 18. The centrally located oil outlet 16 is thus located within the first space 19 and enclosed by the foraminated sleeve 18 preferably in a substantially separated manner. The foraminated sleeve 18 is disposed to be separated from the housing 12 so as to define therebetween a second, cylindrical space 21 within which a filter material, such as multiple-folded filtering paper core 22 as conventionally used, is disposed. A spring 24 is disposed on a top side of the filtering paper core 22 to bias both the filtering paper core 22 and the foraminated sleeve 18 toward the bottom 13 of the housing 12 so as to secure the foraminated sleeve 18 and the filtering paper core 22 in position as is conventionally known.

Inside the first space 19 defined by the foraminated sleeve 18, magnetic filtering means constructed in accordance with the present invention, generally designated with the reference 26 is mounted.

Figure 2:
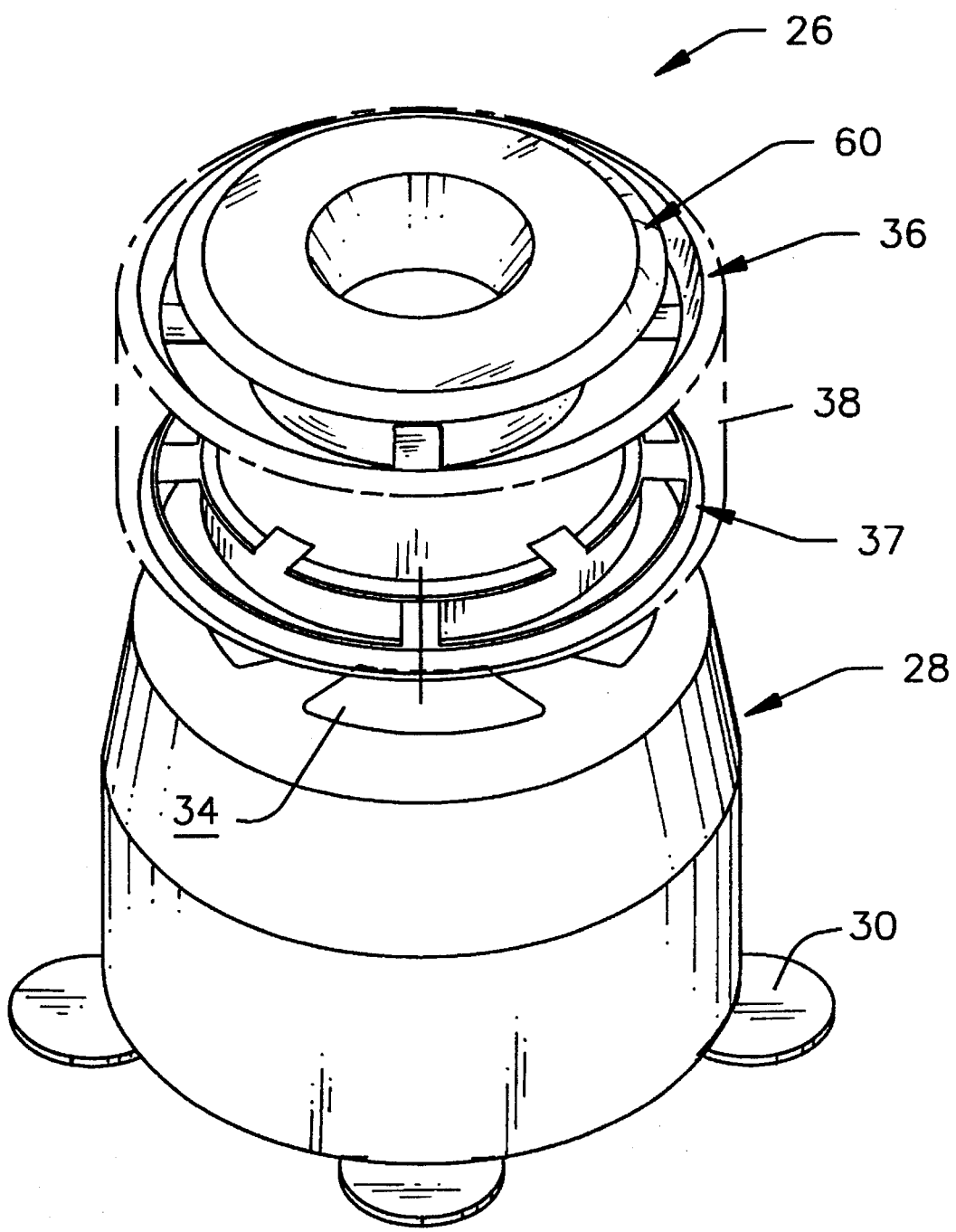
FIG. 2 is a perspective view showing magnetic filtering means constructed in accordance with the present invention and adapted to be used in the oil filter of FIG. 1.
Figure 3:
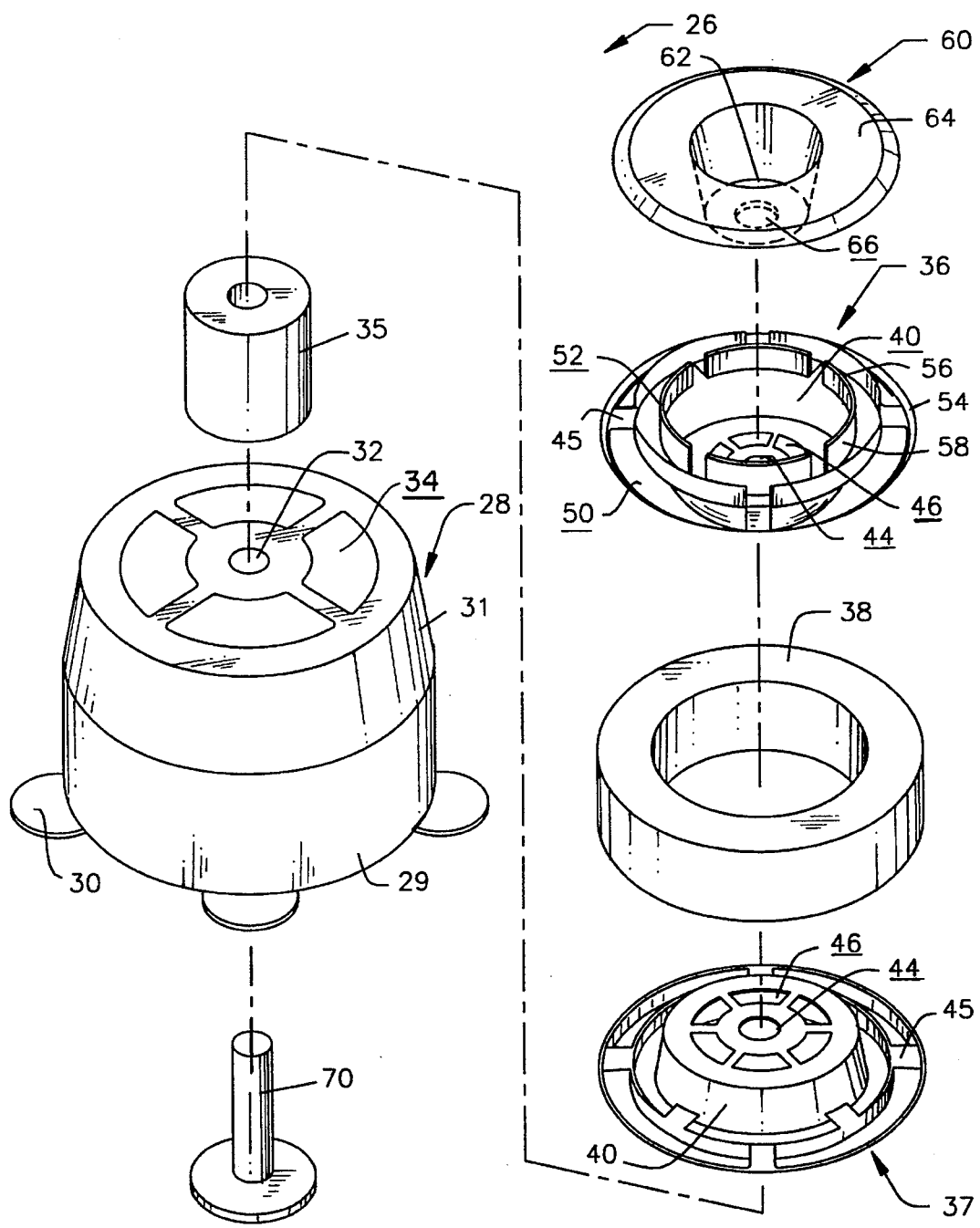
FIG. 3 is an exploded perspective view, showing the magnetic filtering means of FIG. 2.
Figure 4:
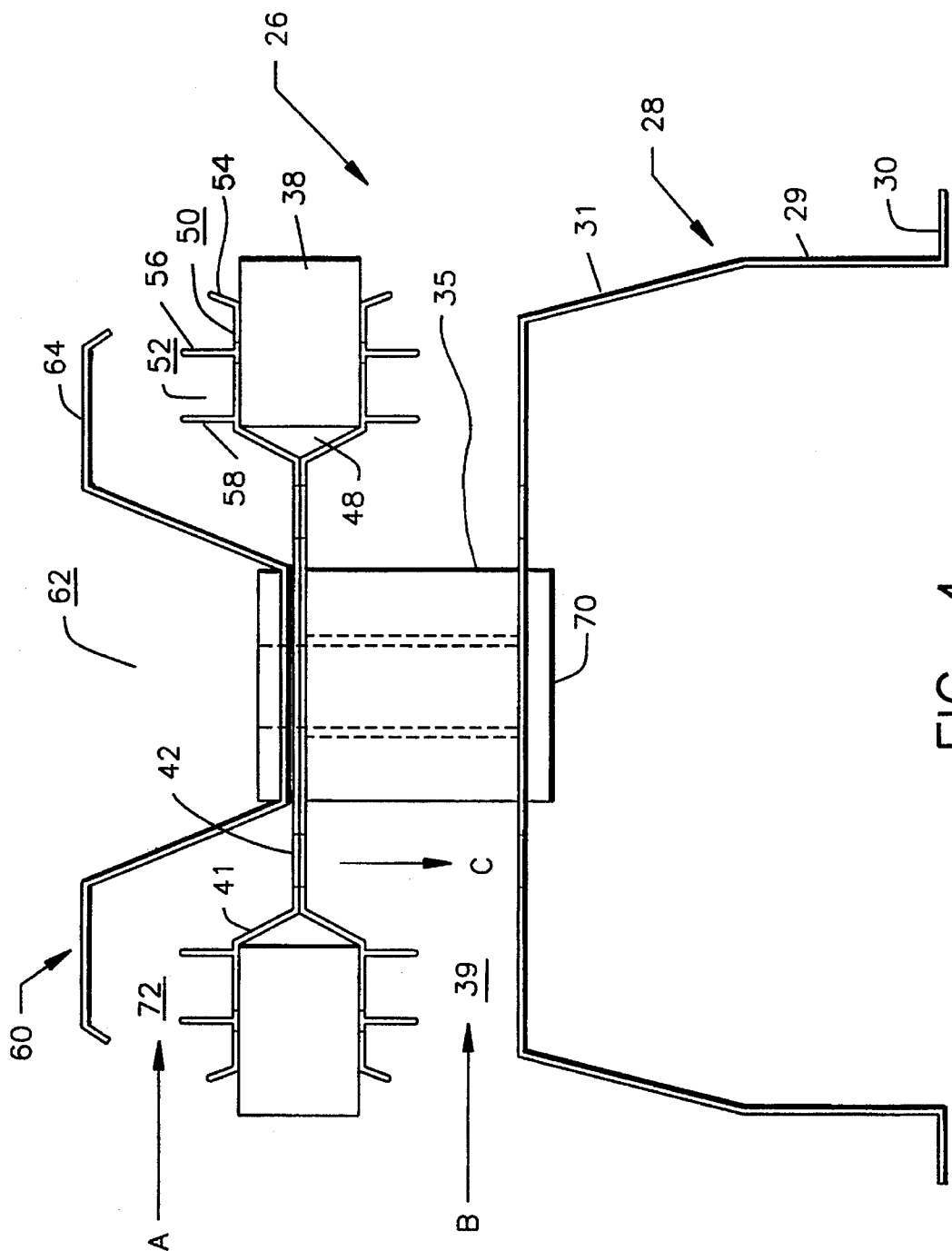
FIG. 4 is a cross-sectional view, showing the magnetic filtering means of FIG. 2.
Figure 7:
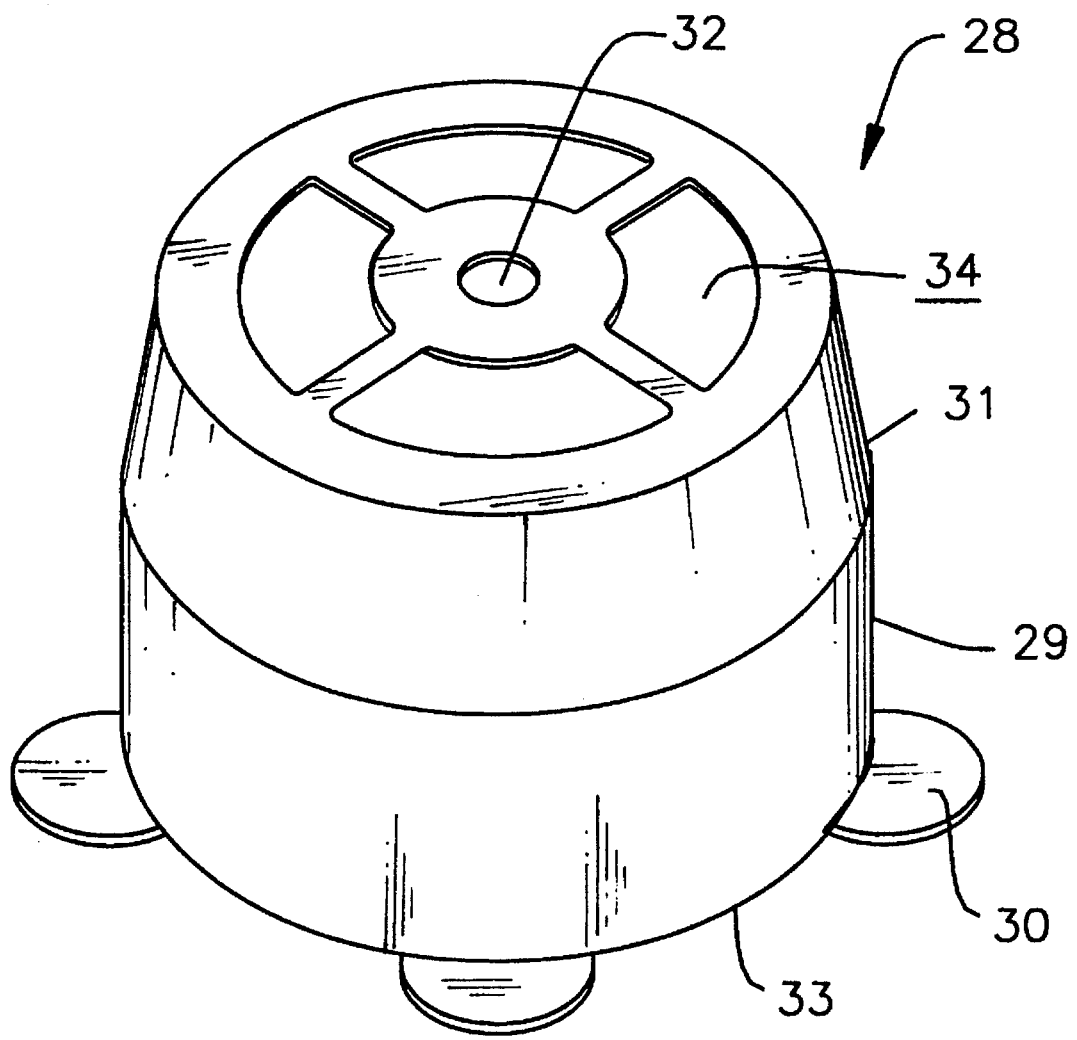
FIG. 7 is a perspective view, showing a base member of the magnetic filtering means.

The magnetic filtering means 26, as shown in FIGS. 2–4, which are respectively a perspective view, an exploded perspective view and a cross-sectional view of the magnetic filtering means 26, comprises a base 28, which is particularly shown in FIG. 7 as a hollow shell member, having a generally cylindrical lower portion 29 and a truncated-conic upper portion 31 integrally formed as a unitary member that has an open, large diameter bottom side and a closed, reduced diameter top side. The diameter of the cylinder 29 of the base 28 is substantially equal to the first diameter of the first space 19 defined by the foraminated sleeve 18 so as to allow the cylinder 29 of the base 20 to be forcibly fit into the foraminated sleeve 18 and thus secured therein. This arrangement allows the base 28 to completely cover the outlet 16 formed on the bottom 13 of the housing 12 with the open, bottom side thereof.

Preferably, the cylinder 29 of the base 28 comprises a plurality of radial tabs 30 which extend, radially outward from a lower circumference 33 of the cylinder of the base 28 to insert into between the foraminated sleeve 18 and a fixed surface 72 (FIG. 1) mounted to or forming a portion of the bottom 13 of the housing 12 to be further secured in position by being nipped between the foraminated sleeve 18 and the bottom 13 of the housing 12 under the action of the biasing spring 24. Preferably, the tabs 30 are soldered to the sleeve 18.

The base 28 also comprises a central hole 32 formed on the top side thereof with a plurality of fan- or sector-shaped slots 34, serving as oil passages, formed around the central hole 32. As is apparent to those having ordinary skills, the oil passages 34 may assume any other shapes without departing from the spirit and scope of the invention. The oil passages 34 allow the oil to flow into the base 28 and then discharge via the outlet 16 enclosed within the base 28.

In the embodiment illustrated, the base 28 is preferably made of thin steel plate of 0.3 mm thickness. The diameter of the cylinder 29 of the base 28 is about 32 mm and that of the top side is about 27 mm. The overall height of the base 28 is approximately 18 mm. The diameter of the central hole 32 may be 3.6 mm. This is only an example of the detailed dimension of the base 28 and it is quite obviously that the base 28 may be modified to give different dimension for use in oil filters having different designs and sizes.

On the top side of the base 28, an elongated spacer 35, preferably in the form of a long cylinder as shown in the drawings, is fixed to support thereon a pair of oppositely arranged particle collection members, the upper member 36 and the lower member 37, between which magnet means 38 is retained. The spacer 35 serves to separate the lower particle collection member 37 away from the base 28 by a predetermined distance, such as 5 mm, so as to define a lower oil path 39 therebetween, as illustrated in FIG. 4. The spacer is formed of a non-ferromagnetic material such as aluminum.

The upper particle collection member 36 is identical to the lower particle collection member 37 and the only difference is that the lower member 37 is disposed in an side-down manner relative to the upper member 36. Thus, the description herein regarding the upper particle collection member 36 is also applicable to the lower particle collection member 37.

Figure 6:
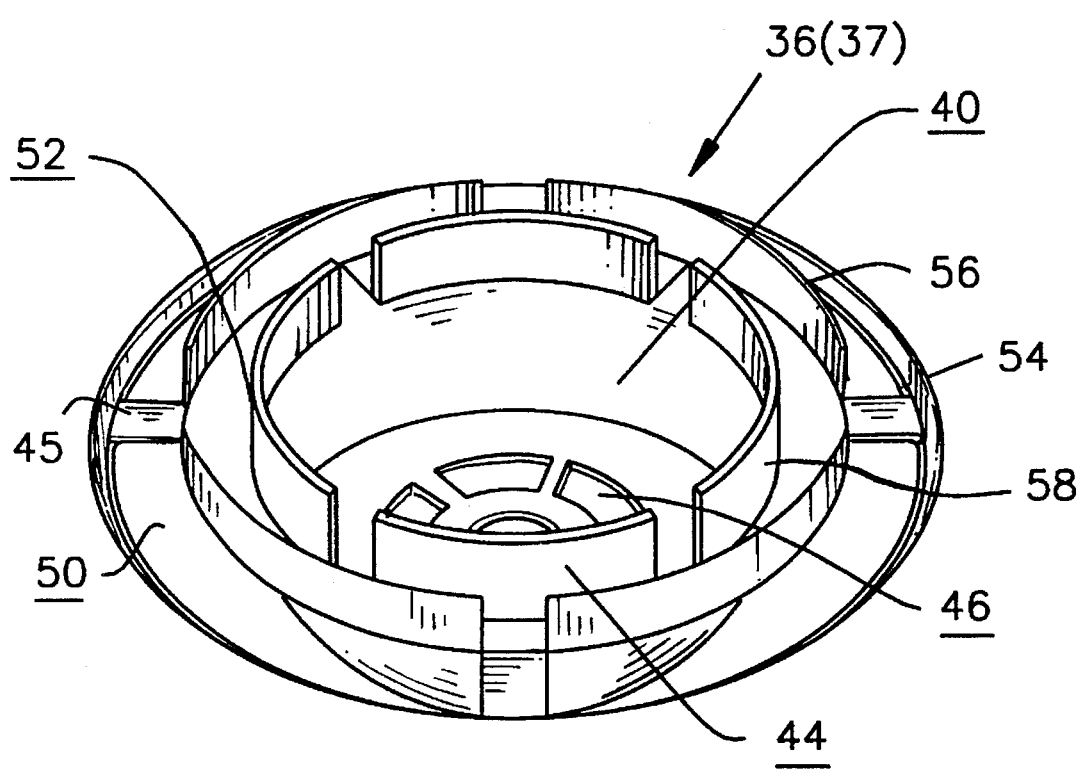
FIG. 6 is a perspective view, showing a particle collection member of the magnetic filtering means.

The structure of the particle collection members 36 and 37 is particularly shown in FIG. 6. As shown, the particle collection member 36 or 37 comprises a pan-shaped body made of a thin metal plate, preferably a ferrous metal, having a central recess 40 with a circumferential flange 45 integrally formed around the recess 40. The recess 40 is defined by an inclined side wall 41 and a substantially flat bottom wall 42. A central hole 44 is formed on the bottom wall 42, opposing the central hole 32 formed on the top side of the base 28. A plurality of sloes 46 in the form of fan or sector are formed around the central hole 44 to provide an oil passage to be described hereinafter.

By having the lower member 37 oriented up side down and having the flat bottoms 42 of the recesses 40 of the upper and lower particle collection members 36 and 37 contacting and resting upon each other, a ring space 48 (see FIG. 4) is formed between the flanges, 45 of the upper and lower members 36 and 37, which surrounds the inclined side walls 41 or the upper and lower particle collection members 36 and 37, to receive and hold therein the magnet means 38. Using ferromagnetic metal, such as steel, to manufacture the upper and lower particle collection members 36 and 37 allows the magnetic flux of the magnet means 38 to be directed to desired locations and orientations. The use of steel plate to form the upper and lower particle collection members 36 and 37 also provides suitable resiliency of the flanges 45 to securely hold the magnet means 38 therebetween.

As shown in, FIGS. 3, 4 and 6, each of the particle collection members 36 and 37 comprises particle collection slots 50 and 52 formed on the flange 45 thereof. The particle collection slots 50 and 52 are defined by a plurality of upright cylindrical strips 54, 56 and 58. The outer strip 54 may be formed by bending the outer circumference of the flange 45 upward. The middle strip 56 and the inner strip 58 may be formed by cutting the plate material of the flange 45 in such a manner to allow the cut material to connect to the remaining material of the flange 45 along an edge thereof and then bending the cut material upward. Preferably, the inner and middle strips 56 and 58 are formed to have substantially the same height and the outer strip 54 has a less height. The outer and middle strips 54 and 56 together define the outer collection slot 50 therebetween and the middle and inner strips 56 and 58 together define the inner collection slot 52 therebetween. Preferably, the outer strip 54 is formed in a slightly upward diverging manner to incline outward.

Alternatively, the strips 54, 56 and 58 may be formed by separate material and then fixed to the flange 45 of the particle collection member 36 or 37 by means of, for example, welding or soldering. However, this alternative requires additional material and thus increases overall weight and cost.

The magnet means 38 is so disposed between the flanges 45 of the upper and lower particle collection members 36 and 37 as to have the magnetic poles thereof located in the proximity of the particle collection slots 50 and 52 of both the upper and lower particle collection members 36 and 37. This allows the ferrous metal particles to be attracted and collected within the particle collection slots 50 and 52 by the most powerful magnetic force that can by supplied by the magnet means 38.

In an embodiment of the present invention, the particle collection members 36 and 37 may be manufactured from steel plate of 0.3 mm thickness. The overall diameter of the particle collection members 36 and 37, is about 27 mm and that of the recess 40 is approximately 16.5 mm. The central hole 44 is about 3.6 mm in diameter.

Unlike the conventional structure disclosed in, for example, U.S. Pat. No. 5,228,990 which requires the size of the magnets to be limited within a strict range, the structure of the present invention allows the size of the magnet means 38 to be varied in a wider range so that the magnet means 38 may comprise only a single large magnet in the form of a ring, as shown in the drawings. In accordance with the present invention, the magnet means 38 that is adapted by the present invention may generate a magnetic field that is as strong as 1,100 Gauss which may apply an attraction force of 180 grams to the ferrous metal particles. As compared to the 800 Gauss magnetic field that is used in some of the conventional devices, the present invention obviously provides a better ferrous metal particle removal rate than the conventional devices.

Although it is shown in the drawings, that the magnet means 38 comprises only a single large magnet, it is also possible to use a number of small magnets disposed in the ring space 48 around the recesses 40 of the upper and lower particle collection members 36 and 37. Quite obviously, there are other different magnet means can be used to replace the one described in the preferred embodiment and shown in the drawings without departing from the spirit and scope of the present invention.

Figure 5:
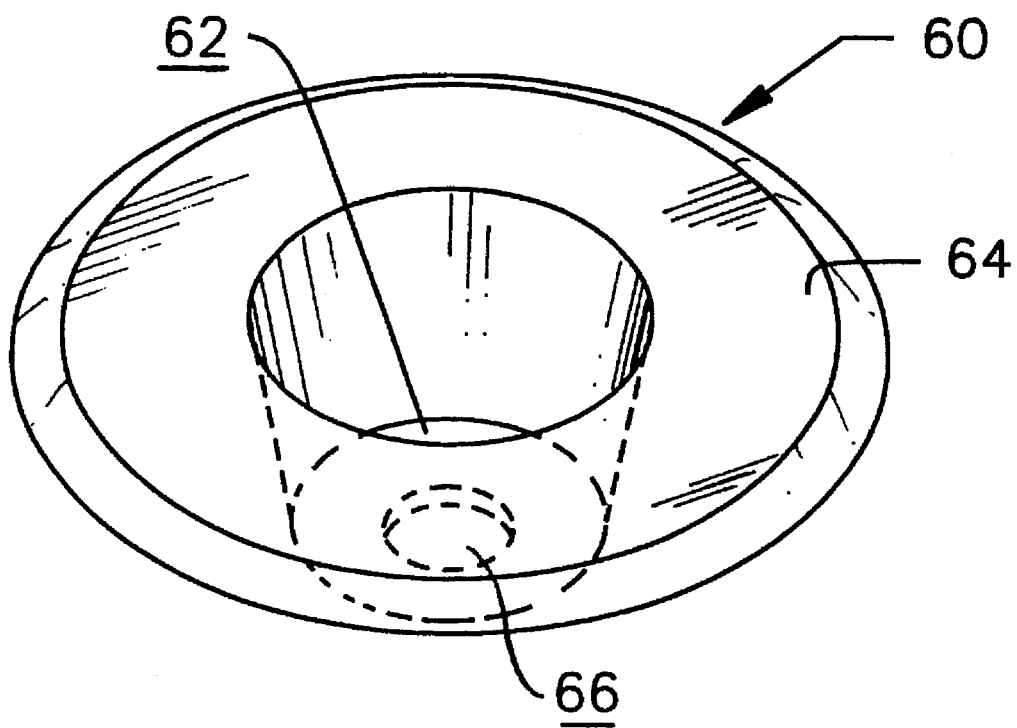
FIG. 5 is a perspective view, showing a top member of the magnetic filtering means.

The magnetic filtering means 26 also comprises a top member 60, preferably in the form of a circular pan as that shown in FIG 5, having a central recess 62 with a circumferential flange 64 mounted to and surrounding the recess 62. The central recess 62 is defined by a substantially flat bottom surrounded by an upward diverging side wall, the circumferential flange 64 being attached to the diverging side wall. The top member 60 comprises a central hole 66 formed on the bottom of the recess 62, opposing the central hole 44 of the upper particle collection member 36. A fastener, such as rivet 70 (see FIGS. 3 and 4), extending in sequence through the central hole 32 of the base 28, the spacer 35, the central holes 44 of the upper and lower particle collection members 36 and 37 and finally the central hole 66 of the top member 60 to secure all these member together to form the magnetic filtering means 26. The magnet means 38 is retained between the upper and lower particle collection members 36 and 37 by their being secured together by the fastener 70.

To avoid un-desired attraction to the ferrous metal particles by the fastener 70 and the top member 60 which interferes with the collection of the ferrous metal particles within the particle collection slots 50 and 52, the fastener 70 and the top member 60 are preferably made of a non-magnetized or non-ferromagnetic material, such as aluminum. Also, the spacer 35 is preferably made of a non-ferromagnetic material, such as aluminum.

The recess 62 of the top member 60 has such a depth that when the recess 62 is secured within the recess 40 of the upper particle collection member 36 by the fastener 70, the circumferential flange 64 thereof is spaced from the circumferential flange 45 of the upper particle collection member 36 by a pre-determined distance, such as 5 mm, and the diverging side wall of the central recess 62 of the top member 60 is also spaced from the inclined side wall 41 of the recess 40 of the upper particle collection member 36 by a predetermined distance, such as 3.5 mm, so as to define an upper oil path 72 between the top member 60 and the upper particle collection member 36.

In operation, the oil that contains ferrous metal particles is conducted to flow through both the upper path 72 above the upper particle collection member 36, as indicated by arrow A of FIG. 4, and the lower path 39 below the lower particle collection member 37, as indicated by arrow B of FIG. 4. Both these two paths 172 and 39 bring the oil through nearby the particle collection slots 50 and 52 of the upper and lower particle collection members 36 and 37. As mentioned previously, the magnetic poles of the magnet means 38 are located in the close proximity of the particle collection slots 50 and 52 and thus the ferrous metal particles that are carried by the oil flow will be attracted and collected in the particle collection slots 50 and 52. The oil that flows through the upper path 72 is further conducted to pass through the passages formed by the slots 46 of the upper and lower particle collection members 36 and 37, as indicated by arrow C of FIG. 4 to join the oil flow through the lower path 39. All the oil will flow into the base 28 through the slots 34 formed on the top side of the base 28 to exit the oil filter 10 through the outlet 16.

It is apparent that although the invention has been described in connection with the preferred embodiment, it is contemplated that those skilled in the art may make changes to the preferred embodiment without departing from the scope of the invention as defined in the appended claims.

What is claimed is:

1. An oil filter comprising:

a housing having a bottom, the bottom having an inlet and an outlet formed thereon;

a foraminated sleeve in the form of a cylinder having a first diameter with a plurality of apertures formed thereon, disposed inside the housing to define therein a first space enclosed by the sleeve with the outlet located therein and a second space between the sleeve and the housing communicating with said inlet;

porous filtering means disposed in the second space;

magnetic filtering means disposed within the first space, the magnetic filtering means comprising a base comprising a hollow shell body having an open bottom end, said open bottom end having a diameter substantially equal to the first diameter of the sleeve and a closed top end having a reduced diameter relative to said open bottom end, said base being located and secured within the first space by base securing means so that the open bottom end thereof completely encloses the outlet formed on the bottom of the housing, the base comprising first oil passage means formed on the closed top end thereof forming fluid communication to an interior space defined by the hollow shell body, particle collection means fixed to the top end of the base member, the particle collection means comprising an upper member which is formed by a plate material having a central recess with a circumferential flange connected to and surrounding an outer circumference thereof and a lower member which is formed by a plate material having a central recess with a circumferential flange connected to and surrounding an outer circumference thereof, the recess of each of the upper and lower member comprising a substantially flat bottom and a surrounding side wall to which the circumferential flange is connected, each said flat bottom having a plurality of slots formed thereon, the upper member and lower member being so arranged that the recesses face away from one another, with the bottoms of the recesses in contact engagement with each other to define a ring space adjacent the radially outer surfaces of the sidewalls and between the circumferential flanges, the upper member being located away from the base and the lower member being located to be facing but spaced from the top end of the base to define a lower oil path therebetween, the upper member having a plurality of particle collection slots formed on a side of its circumferential flange opposite the ring space and the lower member having a plurality of particle collection slots formed on a side of its circumferential flange opposite the ring space, the slots formed on the bottom of the recess of each of the upper and lower members being aligned so as to define second oil passage means, magnet means arranged to have a ring shape to be received and held in the ring space of the particle collection means, the magnet means having magnetic poles located in the close proximity of the particle collection slots formed on circumferential flanges of the upper and lower particle collection members, a top member which is fixed on the upper member in a spaced manner to define an upper oil path therebetween which conducts oil carrying ferrous metal particles to flow through the particle collection slots of the upper particle collection member, which oil flow is further conducted to pass through the second oil passage means so as to enter an interior space of the base via the first oil passage means, the lower oil path conducting a portion of the oil carrying the ferrous metal particles to flow through the particle collection slots formed on the lower particle collection member and then joining the oil flow through the upper oil path and the second oil passage to enter the interior space of the base via the first oil passage means.

2. The oil filter as claimed in claim 1, wherein the base body comprises a cylindrical lower portion which is forcibly fit in the sleeve to secure the base inside the housing, the base securing means further comprising a plurality of radial tabs extending outward from a lower circumference of the cylindrical portion to be located below the sleeve to be held thereby by friction therebetween.

3. The oil filter as claimed in claim 2, wherein the base securing means comprises soldering the tabs to the sleeve.

4. The oil filter as claimed in claim 1, further comprising a fastener which extends through the top end of the base, the recesses of the upper and lower particle collection members and the top member to secure these members together.

5. The oil filter as claimed in claim 4, wherein the fastener comprises a rivet.

6. The oil filter as claimed in claim 1, wherein the particle collection slots of each of the upper and lower particle collection members are defined by cylindrical strips which are formed on the circumferential flange of the respective particle collection member and surrounding the recess of the respective particle collection member so as to define therebetween the particle collection slots.

7. The oil filter as claimed in claim 6, wherein each of the upper and lower particle collection members comprises an inner, a middle and an outer cylindrical strips to define an inner particle collection slot with the inner and middle strips and an outer particle collection slot with the middle and outer strips.

8. The oil filter as claimed in claim 7, wherein the inner cylindrical strip has a height substantially equal to height of the middle cylindrical strip and greater than height of the outer strip.

9. The oil filter as claimed in claim 7, wherein the inner and middle cylindrical strips of each of the particle collection members are formed by cutting a portion of the plate material of the respective particle collection member with an edge connecting to the remaining of the plate material and bending the cut portion relative to the remaining plate material.

10. The oil filter as claimed in claim 7, wherein the outer cylindrical strip is formed by bending an outermost circumference of the circumferential flange.

11. The oil filter as claimed in claim 1, wherein the magnet means comprises a ring magnet receivable within the ring space with the magnetic poles thereof located in the close proximity of the particle collection slots of the upper and lower particle collection members.

12. The oil filter as claimed in claim 1, wherein the upper and lower particle collection members are made of a ferromagnetic material.

13. The oil filter as claimed in claim 12, wherein the ferromagnetic material comprises steel.

14. The oil filter as claimed in claim 1, wherein the top member is made of a non-ferromagnetic material.

15. The oil filter as claimed in claim 14, wherein the non-ferromagnetic material comprises aluminum.

16. The oil filter as claimed in claim 4, wherein the fastener is made of a non-ferromagnetic material.

17. The oil filter as claimed in claim 16, wherein the non-ferromagnetic material comprises aluminum.

18. The oil filter as claimed in claim 1, wherein a spacer is disposed between the top end of the base and the lower particle collection member.

19. The oil filter as claimed in claim 18, wherein the spacer is made of a non-ferromagnetic material.

20. The oil filter as claimed in claim 19, wherein the non-ferromagnetic material comprises aluminum.

* * * * *